May 10, 1927.

P. DOHERTY 1,628,036

VEHICLE HEADLIGHT DIMMING DEVICE

Filed Feb. 13, 1926

Inventor
P. Doherty,

By Clarence A. O'Brien

Attorney

Patented May 10, 1927.

1,628,036

UNITED STATES PATENT OFFICE.

PATRICK DOHERTY, OF GARY, INDIANA.

VEHICLE HEADLIGHT-DIMMING DEVICE.

Application filed February 13, 1926. Serial No. 88,099.

This invention relates generally to motor vehicle headlights and has more particular reference to a dimming device therefor, the primary object of the invention residing in the provision of such a means whereby translucent shields of frosted or colored glass may be swung into position forwardly of the headlight for throwing the rays downwardly and for neutralizing the rays passed through said shields for obviously preventing the blinding of drivers of oncoming vehicles.

A further object of the invention is to provide a headlight dimmer of this character that may also be employed to protect the headlight lens from rain or snow without materially effecting the purpose for which the headlights are intended.

A still further object is to provide means adjacent the driver of the vehicle for permitting the operation of the dimming device.

A still further important object resides in the provision of such construction that may be readily and inexpensively associated with practically all types of vehicles now upon the market.

With the foregoing and other objects in view as the nature of the invention will be better understood, the same comprises the novel form, combination, and arrangement of parts hereinafter more fully described, shown in the accompanying drawing and claimed.

In the drawing wherein like reference characters indicate corresponding parts throughout several views.

Figure 1:
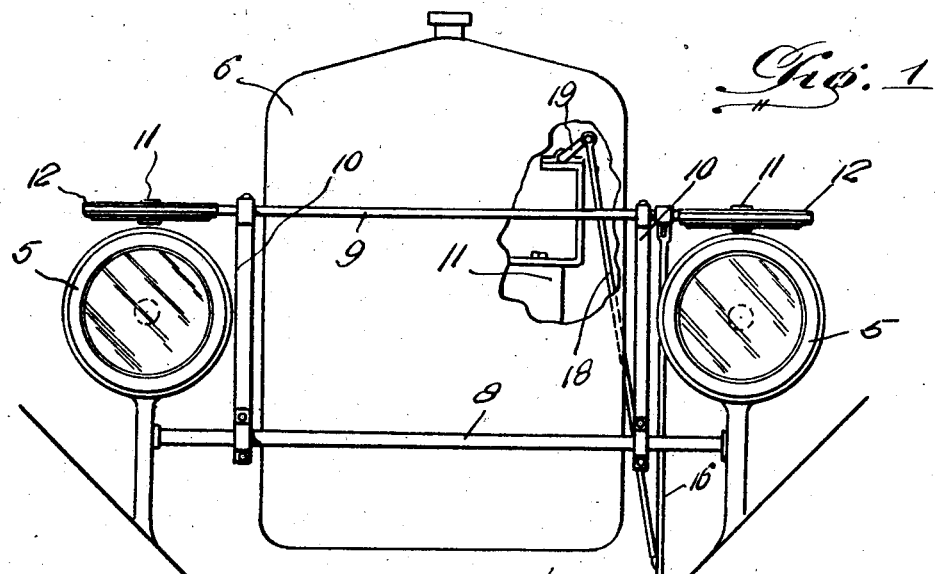
Figure 1 is a fragmentary view in front elevation, parts being broken away of a motor vehicle equipped with my headlight dimming mechanism.
Figure 2:
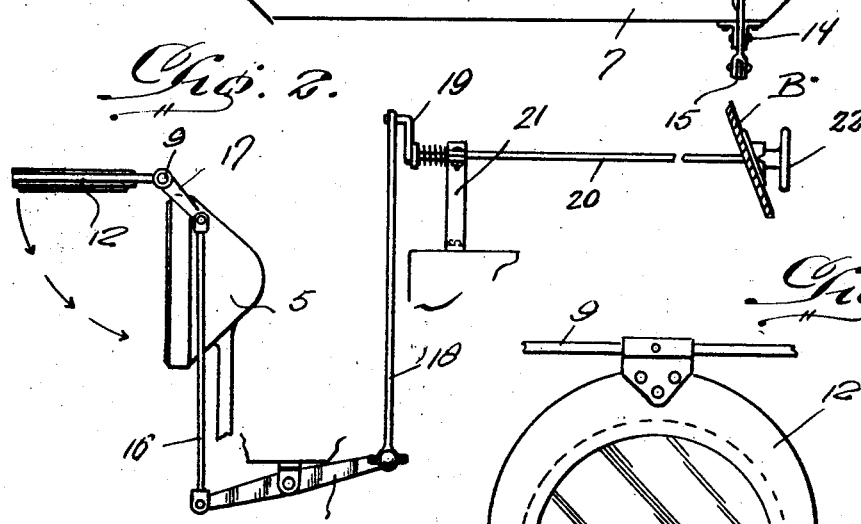
Figure 2 is a side elevation of the mechanism attached.
Figure 3:
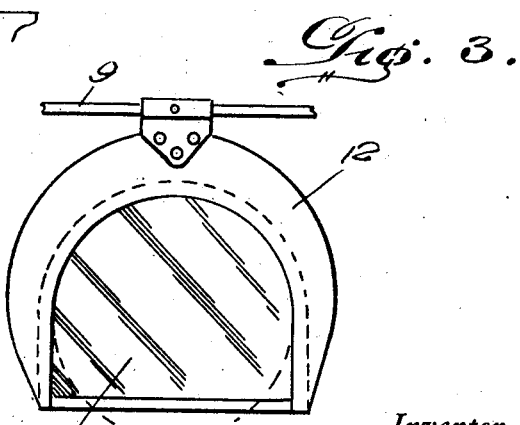
Figure 3 is an elevation of one of the headlight dimmers.

Now having particular reference to the drawing, 5—5 indicates the usual headlights of a motor vehicle upon opposite sides of the radiator 6 supported upon the usual forward chassis frame bar 7, the posts of said headlights being interconnected as usual by a cross bar 8.

My novel dimming device constitutes the provision of a horizontal shaft 9 disposed directly above the headlights 5—5 and being journaled adjacent its opposite ends in the upper ends of bars 10—10 that are rigidly connected at their lower ends to said connecting bar 8 of the headlight posts.

Secured to said shaft 9 at the opposite ends thereof through medium of brackets 11—11 are horseshoe shaped shield frames 12—12 within which are removably mounted shields 13 of frosted or colored glass.

Pivoted intermediate its ends to a bracket 14 upon the under side of the radiator supporting bar 7 at the left hand thereof is a rocker arm 15, to the forward end of which is pivotally connected a vertically extending bar 16 that is in turn pivotally secured at its upper end to an arm 17 secured to the shaft 9 and extending rearwardly therefrom.

Pivoted to the inner end of the rocker arm and extending upwardly, rearwardly and inwardly therefrom is a rod 18 that passes through the hood of the vehicle. The upper end of this rod is pivotally connected to the crank end 19 of a rearwardly extending horizontally shaft 20 that is journaled upon the top side of the bracket 21 secured to the motor A within the hood, the rear end of this shaft projecting through an opening in the vehicle instrument board B, and being equipped with an operating knob 22, suitable means being provided between the knob and the instrument board for retaining the shaft 21 in a plurality of turned positions.

It will be obvious that by turning the shaft 20 in one direction, the rod 18 will be forced downwardly for so rocking the arm 15 upon its pivot as to force upwardly upon the rod 16 which will in turn swing the shields downwardly to the desired position in front of the headlights 5—5 for the several purposes heretofore mentioned.

Even though I have herein shown and described the dimming device as comprising certain detail structural and shaped elements, it is nevertheless to be understood that modifications may be had therein without departing from the spirit and scope of the appended claim.

Having thus described the invention, what I claim as new and desire to secure by Letters Patent is:—

In a dimming device of the class described, for automobile headlights, an oscillatory shaft supported transversely across the front of an automobile radiator above the headlights, a pair of dimmers secured upon the respective ends of the shaft above the headlights, an arm extending rearwardly from said shaft adjacent one end thereof, a rod pivotally secured at its upper end to the inner end of said arm, a rocker arm pivotally supported intermediate its ends beneath the radiator supporting bar, the forward end of said rocker arm being pivotally secured to the lower end of the last mentioned rod, a horizontal shaft arranged rearwardly of the aforementioned transverse shaft, the forward end thereof terminating in a crank, a connection between the rear end of the rocker arm and said crank portion, and an actuating handle secured on the inner end of the horizontal shaft for rotating the same in order that said dimmers may be moved into or out of position in front of the headlights.

In testimony whereof I affix my signature.

PATRICK DOHERTY.